(12) United States Patent
Baba et al.

(10) Patent No.: US 9,909,357 B2
(45) Date of Patent: Mar. 6, 2018

(54) OPENING AND CLOSING DEVICE (71) Applicants: KYUSHU NANOTEC OPTICS CO., LTD., Oita (JP); NISSHO CORPORATION, Tokyo (JP)

(72) Inventors: Junichi Baba, Oita (JP); Ariga Takahashi, Tokyo (JP); Haruki Sato, Tokyo (JP)

(73) Assignees: KYUSHU NANOTEC OPTICS CO., LTD., Oita (JP); NISSHO CORPORATION, Tokyo (JP)

( * ) Notice: Subject to any disclaimer, the term of this patent is extended or adjusted under 35 U.S.C. 154(b) by 0 days.

(21) Appl. No.: 14/908,123

(22) PCT Filed: Jul. 25, 2014

(86) PCT No.: PCT/JP2014/069749
§ 371 (c)(1),
(2) Date: Jan. 28, 2016

(87) PCT Pub. No.: WO2015/016154
PCT Pub. Date: Feb. 5, 2015

(65) Prior Publication Data
US 2016/0208545 A1    Jul. 21, 2016

(30) Foreign Application Priority Data

Jul. 29, 2013  (JP) .................. 2013-156559

(51) Int. Cl.
*E06B 7/00* (2006.01)
*E06B 3/70* (2006.01)
(Continued)

(52) U.S. Cl.
CPC .................. *E06B 7/00* (2013.01); *E06B 3/70* (2013.01); *E06B 7/28* (2013.01); *E06B 7/30* (2013.01);
(Continued)

(58) Field of Classification Search
CPC ..... E06B 7/00; E06B 7/28; E06B 7/30; E06B 3/70; E06B 9/24; G02F 1/137
See application file for complete search history.

(56) References Cited

U.S. PATENT DOCUMENTS

| 2004/0160538 A1 | 8/2004 | Li et al. |
| 2013/0093969 A1* | 4/2013 | Li .............................. B60J 3/04 349/16 |

FOREIGN PATENT DOCUMENTS

| CN | 2140421 | 8/1993 |
| CN | 2605368 | 3/2004 |

(Continued)

OTHER PUBLICATIONS

"International Search Report (Form PCT/ISA/210) of PCT/JP2014/069749", dated Sep. 9, 2014, pp. 1-4.

(Continued)

*Primary Examiner* — Anne Hines
(74) *Attorney, Agent, or Firm* — JCIPRNET (57) ABSTRACT

A door (1) includes a tabular main body (2), a liquid crystal device (4) which is disposed in an aperture portion formed in the main body (2), a handheld portion (3A) which is attached to the main body (2), and a touch sensor (3) which is attached to the handheld portion (3A). Because the touch sensor (3) is attached to the handheld portion (3A), when a person's hand touches the handheld portion (3A), the touch sensor (3) senses the person's hand. The liquid crystal device (4) is capable of varying between an invisible state and a visible state reversibly, and is made into a visible state in the case where the touch sensor (3) senses a person's hand.

8 Claims, 3 Drawing Sheets

(51) Int. Cl.
E06B 7/28 (2006.01)
E06B 9/24 (2006.01)
E06B 7/30 (2006.01)
G02F 1/137 (2006.01)

(52) U.S. Cl.
CPC ................ *E06B 9/24* (2013.01); *G02F 1/137* (2013.01); *E06B 2009/2464* (2013.01)

(56) References Cited

FOREIGN PATENT DOCUMENTS

| | | |
|---|---|---|
| CN | 102401527 | 4/2012 |
| JP | H0243393 | 3/1990 |
| JP | 06-193338 | 7/1994 |
| JP | 06-272451 | 9/1994 |
| JP | 2008-266994 | 11/2008 |
| JP | 3184348 | 6/2013 |
| TW | 201029838 | 8/2010 |

OTHER PUBLICATIONS

"Office Action of Taiwan Counterpart Application", with English translation thereof, dated Jan. 11, 2016, p. 1-p. 11.
"Search Report of Europe Counterpart Application", dated Feb. 6, 2017, p. 1-p. 6.
"Office Action of China Counterpart Application" with English translation thereof, dated Nov. 10, 2016, p. 1-p. 15, in which the listed references were cited.
"Office Action of China Counterpart Application," with English translation thereof, dated May 12, 2017, p. 1-p. 11.
"Office Action of China Counterpart Application," with English translation thereof, dated Oct. 23, 2017, p. 1-14.

\* cited by examiner

OPENING AND CLOSING DEVICE

CROSS-REFERENCE TO RELATED APPLICATION

This application is a 371 application of an International PCT application serial no. PCT/JP2014/069749, filed on Jul. 25, 2014, which claims the priority benefits of Japan Application No. 2013-156559, filed on Jul. 29, 2013. The entirety of each of the above-mentioned patent applications is hereby incorporated by reference herein and made a part of this specification.

BACKGROUND

Field of the Invention

The present invention relates to an opening and closing device. For details, the present invention relates to an opening and closing device such as a door or a window which is formed in a wall partitioning a space into two spaces, and is installed in an aperture area for the coming and going of people and objects.

Background Art

Doors are a type of opening and closing device which are installed in a doorway of a building, a doorway of a room of an interior of a building, and a doorway of a vehicle.

The doors are classified into a variety of types based on differences in structure and motion.

For example, there is a hinged door which oscillates (swings) rounding on hinged places, a sliding door which slides along a groove or a rail, and further a revolving door.

For example, an automatic door described in Patent Document 1 has the following structure.

That is, the automatic door described in Patent Document 1 includes a pair of door main bodies composed of toughened glass or the like, and the upper end rims of the door main bodies are reinforced by the upper reinforcing frame made from metal. Further, the upper end rims of the door main bodies are suspended slidably in a transom. Further, the respective lower end rims of the door main bodies are reinforced by the lower reinforcing frame made from reinforced synthetic resin that low-permittivity synthetic resin is reinforced to have strength equivalent to that of a metallic material.

Further, under the floor of the door passage formed by opening the two door main bodies 121, a capacitance sensor is laid down so as to extend from the entrance side up to the exit side of the door passage.

Further, in Patent Document 2, there is disclosed an automatic door in which a dimming glass is fitted into a door. This automatic door includes a sensor which senses a passer, and makes the dimming glass visible or invisible by a signal transmitted from this sensor.

Further, in Patent Document 3, there is disclosed an elevator apparatus using a dimming glass as a vision glass of a car door. This elevator apparatus senses the car stopping in a door zone, and makes the dimming glass visible.

CITATION LIST

Patent Literature

Patent Document 1: Japanese Published Unexamined Utility Model Application No. H6-67777 (JP1994067777U)
Patent Document 2: Japanese Published Unexamined Patent Application No. H6-193338 (JP1994193338A)
Patent Document 3: Japanese Published Unexamined Utility Model Application No. H6-49470 (JP1994049470U)

SUMMARY OF THE INVENTION

Technical Problem

As is disclosed in Patent Document 1, an automatic door is generally made such that the entire surface of the door main body is composed of transparent glass, so as to be able to see the interior of a building or a room from the outside. In this case, because it is possible to understand the situation on the other side of the automatic door, it is possible to avoid collision with a person on the other side of the automatic door. However, it is impossible to protect confidential matters or privacy in the interior of a building or a room.

In contrast, there is an automatic door in which the entire surface of the door main body is made opaque, so as to make the interior of a building or a room invisible from the outside. In this case, it is possible to protect confidential matters in the interior of the building or the room. However, a person and a person, or a person and objects may collide with each other when the automatic door is opened to step out or step in.

As in Patent Document 2 and Patent Document 3, in the door using dimming glass, the transparency of the dimming glass is changed by a sensor signal, and the door is capable of achieving the two effects of protection of confidential matters and privacy, and collision prevention.

However, in general, 50 volts or more is needed as a driving voltage for making the dimming glass invisible or visible, and dedicated facilities for power feeding are indispensable.

Therefore, there has been the problem that power consumption for the dimming glass is needed in addition to the power consumed by the automatic door and the like, which results in high power consumption.

Further, electrical equipment become large-scaled, which is unable to be built into the automatic door main body, and it is necessary to provide electrical equipment separately from the automatic door main body.

The present invention has been achieved in consideration of the above-described problems, and an object of the present invention is to provide an opening and closing device which is capable of simply making visibility between an interior space and an exterior space better or worse.

Solution to Problem

The inventors of the present invention have conducted extensive research in order to solve the above-described object. As a result, the inventors have found that an opening and closing device is equipped with a sensing unit which is capable of sensing an object, and a liquid crystal device which is able to be driven at a low voltage, thereby solving the above-described object, which has brought the present invention to completion.

Further, making a liquid crystal device visible or invisible may be described as dimming or driving in some cases.

Further, in this specification, a "liquid crystal device" means that a liquid crystal composition is sandwiched between two substrates to which electrodes are respectively attached, and is called a liquid crystal element as well.

The substrates overall mean various types of substrates functioning as substrates such as film substrates or glass substrates, and in the case where merely substrates are described in this specification, it is the overall meaning as described above.

In this specification, "making visible" means varying a liquid crystal device into a transparent state, and "making invisible" means varying a liquid crystal device into an opaque state. However, this is not defined in terms of quantitative transparency, but is judged visually and based on logical order.

In accordance with a first aspect of the present invention, an opening and closing device includes a sensing unit which senses an object, and a liquid crystal device which is capable of varying between an invisible state and a visible state reversibly, and which is driven at a low voltage, to be made into a visible state or an invisible state in the case where the sensing unit senses an object.

With this liquid crystal device, it is possible to see the other side of the opening and closing device, and in contrast, it is impossible to be seen from the other side of the opening and closing device.

Further, by the sensing unit, sensing of an object is performed in contact or noncontact with the object, and a signal for making the liquid crystal device into a visible state or an invisible state is transmitted.

Further, in accordance with a second aspect of the present invention, in the opening and closing device according to the first aspect of the present invention, the liquid crystal device is able to be driven at less than 30 volts.

In this case, because the liquid crystal device is driven at small power, it is possible to reduce the power consumption to an extremely low level. In addition, a lower limit voltage value may be an amount needed for driving the liquid crystal device, and is preferably 5 volts or more, and further preferably 15 volts or more from the standpoint of driving stability.

Further, in accordance with a third aspect of the present invention, in the opening and closing device according to the second aspect of the present invention, the liquid crystal device is able to be driven by batteries.

In this case, it is possible to build a power feeding device in which batteries are built-in, into the opening and closing device of the present invention.

Because the liquid crystal device is driven by batteries as well, it is possible to use the opening and closing device even at a time of unstable power supply.

There is no restriction on the types of batteries. Not only can a dry cell or a storage battery be used, but a solar battery (a solar panel) used for a calculator or the like, a film-format transparent solar battery, a piezoelectric device which converts pressure into electric energy, and various types of power generating units which convert heat energy, vibrational energy, and further motion energy generated by an opening and closing motion of the opening and closing device, and the like into electric energy can be used as batteries.

Further, in the case where storage batteries are used, those may be used in combination with the aforementioned solar batteries or the power generating units.

Further, in accordance with a fourth aspect of the present invention, the opening and closing device according to any one of the first to third aspects of the present invention includes a main body in which an aperture portion is formed, and the liquid crystal device is disposed in the aperture portion, and a handheld portion which is attached to the main body, and the sensing unit senses an object which comes into contact with the handheld portion.

In this case, the sensing unit is built-in as a part or a whole of the handheld portion, and senses an object which comes into contact with the handheld portion. Therefore, the liquid crystal device is not made into a visible state or an invisible state at any time when an object merely passes nearby the opening and closing device without touching the handheld portion.

Further, because the liquid crystal device is disposed in the aperture portion, usually, it is possible for the liquid crystal device to serve as a transparent member installed in the aperture portion of the opening and closing device.

Further, in accordance with a fifth aspect of the present invention, the opening and closing device according to any one of the first to third aspects of the present invention includes a main body in which an aperture portion is formed, a transparent member which is disposed in the aperture portion, and in which the liquid crystal device is attached to at least a part, and a handheld portion which is attached to the main body, and the sensing unit senses an object which comes into contact with the handheld portion.

In this case, because the liquid crystal device is attached to at least a part of the transparent member disposed in the aperture portion, even when a person or objects collide against the transparent member, the transparent member is hard to break.

Further, in accordance with a sixth aspect of the present invention, in the opening and closing device according to any one of the first to third aspects of the present invention, the sensing unit senses an object located within a predetermined range from the liquid crystal device.

In this case, when an object is merely located within a predetermined range from the sensing unit, it is possible to make the liquid crystal device into a visible state or an invisible state.

For example, in the case where a motion sensor is used as the sensing unit, an object which falls within a set range is sensed by the sensor. As a result, an invisible state or a visible state of the liquid crystal device varies.

Further, because a noncontact-type sensor is used, it is effectively used in places such as a hospital or a kitchen where it is necessary to pay careful attention to hygiene.

Further, in accordance with a seventh aspect of the present invention, in the opening and closing device according to any one of the first to third aspects of the present invention, the liquid crystal device is made into an invisible state or a visible state in the case where sensing by the sensing unit is released.

In this case, not only when the sensing unit senses an object, but also in the case where sensing is released, the liquid crystal device is capable of being made into an invisible state or a visible state.

For example, in the case where the sensing unit senses an object, and the liquid crystal device is made invisible, if there is no need to maintain the invisible state, the liquid crystal device may be returned to the original visible state at the point of releasing sensing. Therefore, it is possible to always keep the same visible state and the appearance of the door except for a time of sensing.

Further, in accordance with an eighth aspect of the present invention, the opening and closing device according to any one of the first to third aspects of the present invention includes a time setting unit which sets a time needed for the liquid crystal device to be made from an invisible state into a visible state, and a time needed for the liquid crystal device to be made from a visible state into an invisible state in the case where the sensing unit senses an object, or in the case where sensing by the sensing unit is released.

In this case, it is possible to control a time in which the state of the liquid crystal device varies.

Effects of the Invention

The opening and closing device according to the present invention is capable of simply making visibility between an interior space and an exterior space better or worse.

DESCRIPTION OF THE (PREFERRED) EMBODIMENTS

Hereinafter, embodiments of the present invention will be described with reference to the drawings in order to understand the present invention. However, the present invention is not limited to the following embodiments.

Figure 1:
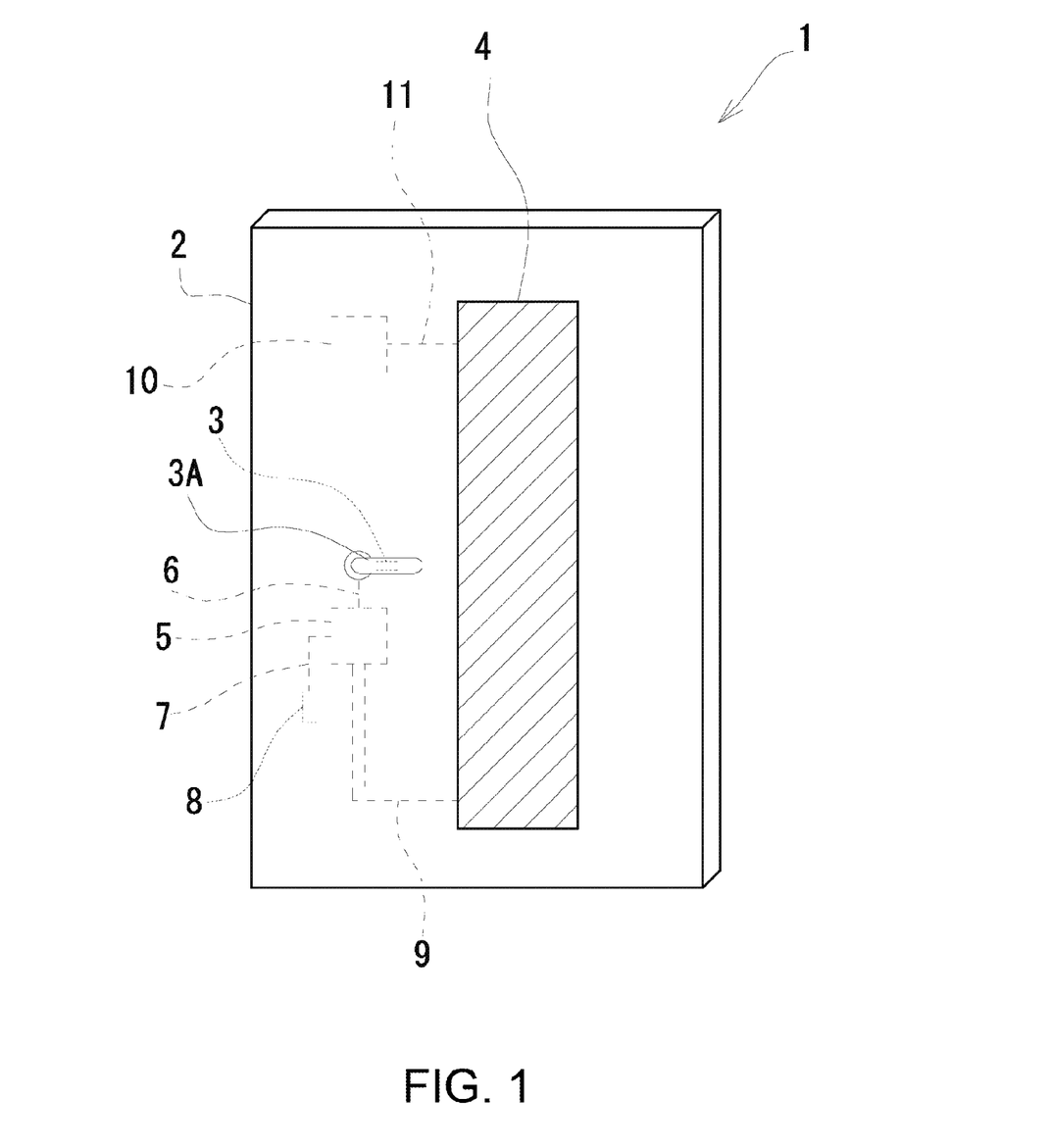
FIG. 1 is a schematic diagram showing an example of a door to which the present invention is applied.

FIG. 1 is a schematic diagram showing an example of a door to which the present invention is applied.

A door (which is an example of an opening and closing device) 1 of the present invention shown in FIG. 1 includes a tabular main body 2.

Further, the door 1 of the present invention includes a liquid crystal device 4 which is disposed in an aperture portion formed in the main body 2.

Further, the aperture portion is formed along the longitudinal direction of the main body 2 in substantially the central portion of the main body 2, accordingly, the liquid crystal device 4 as well is disposed along the longitudinal direction of the main body 2 in substantially the central portion of the main body 2.

Further, the door 1 of the present invention includes a handheld portion 3A which is attached to the main body 2.

Further, there is no restriction on a shape of the handheld portion, various shapes such as a lever shape, a knob shape, a tab shape, and a grip ball shape may be utilized. Further, in the case where the opening and closing device of the present invention is a window figure, its window frame is a handheld portion. Further, various types of handles which are often used for sliding doors and the like may be used as a handheld portion.

Further, the door 1 of the present invention includes a touch sensor (which is an example of a sensing unit) 3 which is attached to the handheld portion 3A.

Here, because the touch sensor 3 is attached to the handheld portion 3A, when an object, for example, a person's hand touches the handheld portion 3A, the touch sensor 3 senses that person's hand.

Various types of sensors may be utilized as the sensing unit.

The touch sensor is an example of a contact-type sensor. Further, it is possible to use biometric authentication such as fingerprint authentication, vein authentication, and retina verification as a contact-type sensor because of an optical contact with a human body.

Further, as long as it is a noncontact-type sensor, a motion sensor or an optical sensor which senses a motion of an object, an acoustic wave sensor which senses an acoustic wave emitted from an object, a hyperthermic sensor which senses a temperature of an object, particularly a human body, an electrostatic sensor which senses static electricity charged from a human body, and the like may be cited.

In addition, an RF tag such as a noncontact IC card may be used so as to contact a corresponding antenna device in some cases. Meanwhile, in general, these as well may be used as a noncontact-type sensor. In general, an RF tag and an antenna device corresponding thereto are collectively called an RFID, and the description of RFID in this specification means a unit of an RF tag and an antenna device. In addition, it is possible to use authentication by a barcode as a noncontact-type sensor.

These sensors may be singularly used, or may be used in combination with several types of sensors. Further, a contact-type sensor and a noncontact-type sensor may be used in combination.

Further, the liquid crystal device 4 is capable of varying between an invisible state and a visible state reversibly, and is made into a visible state in the case where the touch sensor 3 senses a person's hand.

Further, the touch sensor 3 senses a person's hand while the person is touching the handheld portion 3A, but releases the sensing when the person's hand moves away from the handheld portion 3A.

Then, the liquid crystal device 4 is made into an invisible state in the case where sensing by the touch sensor 3 is released.

Here, the liquid crystal device used for the present invention, which is in an invisible state in a state before applying a voltage, and is made visible when applying a voltage, will be described. In the present invention, a polymer dispersed liquid crystal (=PDLC) containing a liquid crystal composition, which is configured to be driven at a low voltage, for example, less than 30 volts is used.

Chemical compounds other than monomers, various types of additives, and the like may be further added to this liquid crystal composition within a range which does not impair the effects of the present invention.

The polymer dispersed liquid crystal may be prepared through the commonly-known method. For example, a small amount of monomer (polymerizable compound) is added to a liquid crystal composition, and is injected into a liquid crystal display cell. Thereafter, only the monomer is polymerized under ultraviolet irradiation, to form a polymeric molecular structure in the device.

Further, the liquid crystal device 4 has the structure in which the liquid crystal composition is sandwiched between, for example, two transparent film substrates facing each other.

Further, in the aforementioned structure, transparent electrodes composed of, for example, indium tin oxides (ITO) are respectively attached to the two film substrates.

In the case where the liquid crystal device has the structure of sandwiching by the film substrates as described above, when the stiffness (flexibility) of the film substrates is low, the stiffness of the liquid crystal device as well is reduced, and the degree of freedom is increased with respect to bending stress.

Accordingly, it is highly convenient in the case where the liquid crystal device is pasted on a transparent member having a curved surface to be used.

Further, in the case where the stiffness of the film substrates is high, the stiffness of the liquid crystal device is increased, and it is highly convenient in the case where the liquid crystal device is desired to be used in a planar shape.

Further, in the case where the liquid crystal device is singularly used, or in the case where the stiffness thereof is desired to be increased, substrates having high hardness such as glass substrates may be used.

Further, it may be selected to use which substrate in accordance with its purpose. Further, for example, one substrate may be a film substrate, and the other one may be a glass substrate.

Further, in accordance with its purpose, a film material or the like which is different from a film substrate may be used in combination for the substrate. For example, a combination of the film-format transparent solar battery described above, or pasting a protective film or a transparent color film may be cited. As such a combination of a material which is different from a substrate, the material may be used so as to be pasted on the entire surface of the substrate, or partially pasted on the substrate.

As a matter of course, various types of protective compositions such as a hard coating agent and a top coating agent may be applied to a substrate, a film material or the like, so as to make the liquid crystal device difficult to break by external force.

Further, in the case where a voltage is applied to the liquid crystal device, the liquid crystal molecules in the aforementioned liquid crystal composition are oriented substantially vertical to the two film substrates.

That is, in the case where a voltage is applied to the liquid crystal device, the liquid crystal device is made into a visible state.

Further, in the case where no voltage is applied to the liquid crystal device, the liquid crystal molecules in the aforementioned liquid crystal composition are irregularly oriented.

That is, in the case where no voltage is applied to the liquid crystal device, the liquid crystal device is made into an invisible state.

Further, the door 1 of the present invention includes a control circuit 5 which is built into the main body 2. Further, the control circuit 5 is connected to the touch sensor 3 via a sensor cable 6. Further, the control circuit 5 is connected to the liquid crystal device 4 via a liquid crystal device control cable 9.

Further, the door 1 of the present invention includes a battery 8 which is a power feeding unit which is built into the main body 2. Further, the battery 8 is connected to the control circuit 5 via a power supply cable 7.

With the above-described configuration, when a person touches the handheld portion 3A with his/her hand, the touch sensor 3 senses the hand, and a sensing signal is transmitted to the control circuit 5 through the sensor cable 6.

Moreover, the control circuit 5 applies an extremely low voltage which is less than 30 volts from the battery 8, to the liquid crystal device 4 through the liquid crystal device control cable 9.

Then, the liquid crystal device 4 to which an extremely low voltage which is less than 30 volts is applied is made into a visible state.

A conventional dimming glass has required a voltage of 100 volts or more for driving a liquid crystal composition in the glass. In Japan, in the case of carrying out work at a voltage over 36 volts, an electrician's qualification is necessary. Therefore, large-scale work by an electrical work specialist is needed with the conventional device.

However, the liquid crystal device used for the present invention is driven at a voltage which is less than 30 volts, that is, at an extent which does not require electrical work.

Further, because a voltage applied to the liquid crystal device used for the present invention is a low voltage which is less than 30 volts, deterioration of the electrodes of the liquid crystal device used for the present invention becomes less than deterioration of the electrodes of the liquid crystal device used for the conventional dimming glass.

Further, because deterioration of the insulator and deterioration of the semiconductor device or the like as well progress more rapidly when a voltage is higher, the lifetime of the opening and closing device itself of the present invention is extended.

Further, when the person moves his/her hand away from the handheld portion 3A, the sensing of the touch sensor 3 is released, thereby stopping transmission of a sensing signal to the control circuit 5.

Then, because the control circuit 5 as well does not apply a voltage from the battery 8 to the liquid crystal device, the liquid crystal device 4 to which no voltage is applied is made into an invisible state.

Further, the door 1 of the present invention includes a time setting unit 10 which sets a time needed for the liquid crystal device 4 to be made from an invisible state into a visible state, and a time needed for the liquid crystal device 4 to be made from a visible state into an invisible state in the case where the touch sensor 3 senses an object, or in the case where sensing by the touch sensor 3 is released.

Further, the time setting unit 10 is connected to the liquid crystal device 4 via a time setting cable 11.

As a time setting unit, for example, a computer device or a computer platform which is programmable may be cited.

Further, an input device for setting a time may be installed in the main body of the opening and closing device of the present invention. Or, the opening and closing device of the present invention may be electrically connected from an external computer device independently of the main body, so as to input a time thereto from this external computer device.

Further, a time needed for the liquid crystal device to be made from an invisible state into a visible state, and a time needed for the liquid crystal device to be made from a visible state into an invisible state may be the same or different from one another, and may be arbitrarily set.

Here, the liquid crystal device may not necessarily be made into a visible state in the case where the sensing unit senses an object. For example, the liquid crystal device may be made into an invisible state in the case where the sensing unit senses an object.

For example, provided that the opening and closing device of the present embodiment is a window figure, and the sensing unit senses the person when a person approaches the liquid crystal device, thereby making the liquid crystal device into an invisible state while enjoying the external view through the liquid crystal device in a visible state, there is no worry by the person that he or she can be seen from the outside, which is advantageous.

In this way, in accordance with the purpose of the opening and closing device, it is possible to make the liquid crystal device into an invisible state or a visible state timely in the case where the sensing unit senses an object.

Further, the liquid crystal device may not necessarily be made into a visible state when a voltage is applied, and further, the liquid crystal device may not necessarily be in an invisible state when no voltage is applied. For example, in contrast, the liquid crystal device may be made into an invisible state when a voltage is applied, and the liquid crystal device may be in a visible state when no voltage is applied.

Further, in the door of the present invention, the liquid crystal device itself may be used as the main body.

However, provided that the opening and closing device of the present invention includes the main body separately from the liquid crystal device, the strength of the opening and closing device is increased, which is preferable.

Further, the liquid crystal device may not necessarily be disposed on the entire surface of the aperture portion which is formed in the main body. For example, the liquid crystal device may be attached to at least a part of a transparent member such as a glass member disposed in the aperture portion.

In addition, provided that the liquid crystal device is disposed in the aperture portion, usually, the liquid crystal device is capable of serving as a transparent member installed in the aperture portion of the opening and closing device.

Further, on the other hand, provided that the liquid crystal device is attached to at least a part of a transparent member such as a glass member disposed in the aperture portion, even when a person or objects collide against the transparent member, the liquid crystal device functions as a protective film, which makes the transparent member hard to break.

Further, as a transparent member, for example, a glass plate and a transparent plastic plate may be cited. Further, a shape of the transparent member may be not only a planar shape, but also a concave or convex shape, or a shape in combination of these. Provided that the transparent member is a concave-convex shape, the lens effect is expected, thereby making it possible to adjust a view angle.

Further, the sensing unit may not necessarily be to sense an object which touches the handheld portion. For example, the sensing unit may sense an object located within a predetermined range from the liquid crystal device in the same way of an optical sensor.

Here, a "predetermined range" means, for example, a range in which it is possible to reach the liquid crystal device.

In addition, in the case where the sensing unit is to sense an object touching the handheld portion, the liquid crystal device is not made into a visible state or an invisible state at any time when an object merely passes nearby the opening and closing device.

Further, on the other hand, if the sensing unit senses an object located within a predetermined range from the liquid crystal device, it is possible to make the liquid crystal device into an invisible state or a visible state when an object is merely located in the predetermined range from the liquid crystal device.

Further, the door of the present invention may not necessarily include a time setting unit for adjusting a dimming time of the liquid crystal device.

By providing the time setting unit, for example, it is possible to make a time needed for the liquid crystal device to be made from an invisible state into a visible state when touching the handheld portion short, and make a time needed for the liquid crystal device to be made from a visible state into an invisible state when moving a hand away from the handheld portion long.

Further, a battery is not necessarily used as a power source. For example, a commercial power source may be used.

The liquid crystal device used for the present invention does not need a high voltage as described above. In the case where power for moving the door itself is needed as an automatic door, power for driving the liquid crystal device may be supplied in addition from the power for moving the door itself.

Figure 2A:
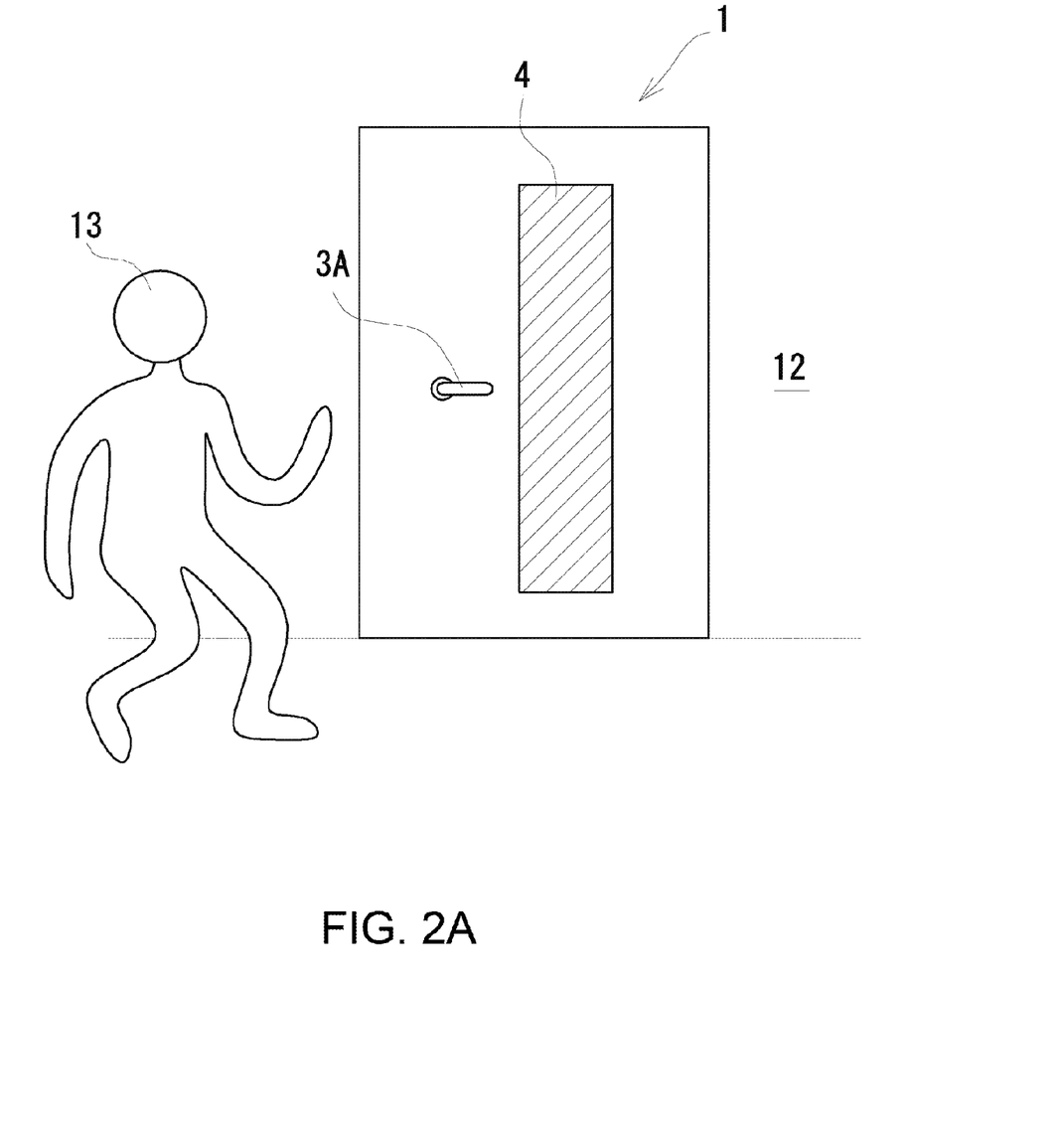
FIG. 2A is a schematic diagram showing an example of a state before a person touches a handheld portion of the door to which the present invention is applied.
Figure 2B:
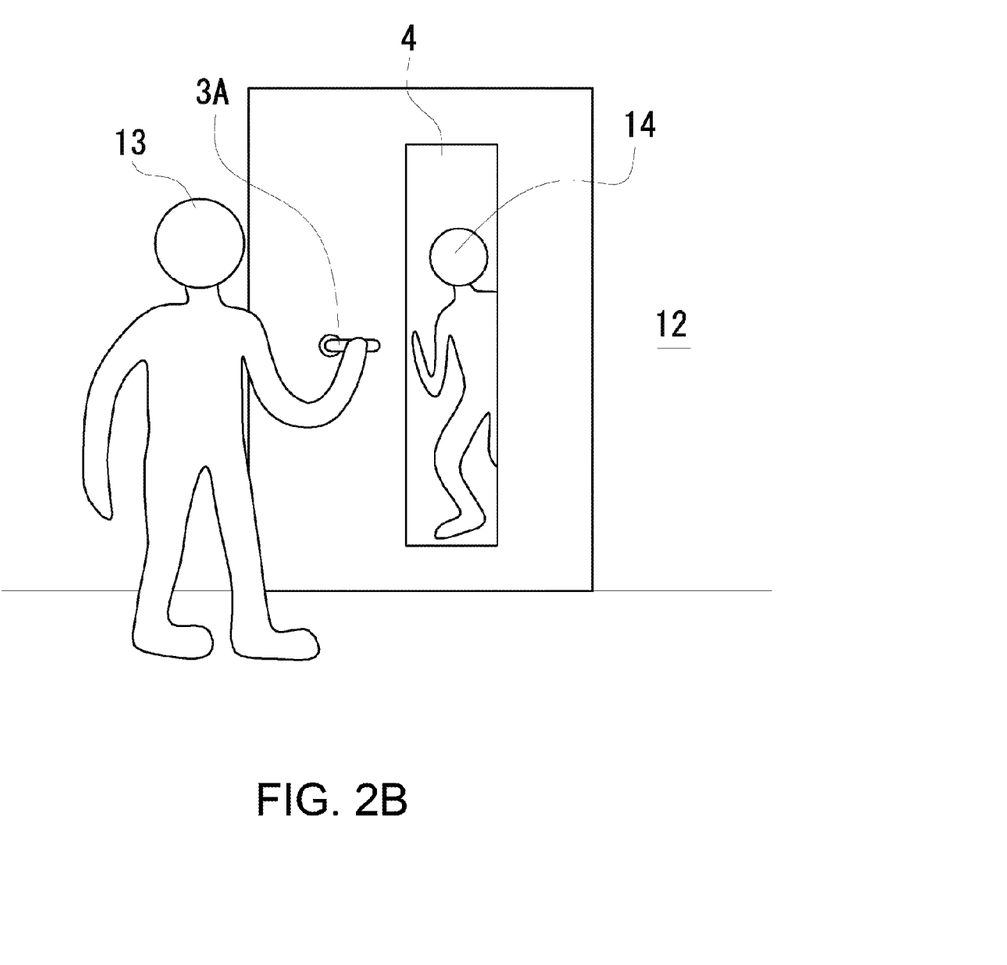
FIG. 2B is a schematic diagram showing an example of a state when the person touches the handheld portion of the door to which the present invention is applied.

FIG. 2A is a schematic diagram showing an example of a state before a person touches a handheld portion of the door to which the present invention is applied, and FIG. 2B is a schematic diagram showing an example of a state when the person touches the handheld portion of the door to which the present invention is applied.

As shown in FIGS. 2A and 2B, the door 1 of the present invention is installed in a wall 12 separating a room and a hallway in a building.

Further, as shown in FIG. 2A, an indoor person 13 moves to go out of the room, and approaches the door 1 of the present invention.

At this point, because the indoor person 13 does not touch the handheld portion 3A of the door 1 of the present invention, the liquid crystal device 4 is in an invisible state, and it is impossible to see the other side of the door 1 of the present invention, that is the hallway.

Then, as shown in FIG. 2B, when the indoor person 13 touches the handheld portion 3A of the door 1 of the present invention, the touch sensor 3 senses the person's hand, and the liquid crystal device 4 is made into a visible state.

Accordingly, it is possible to see the other side of the door 1 of the present invention through the liquid crystal device 4.

Further, FIG. 2B shows an example that it is possible to see a hallway person 14 through the liquid crystal device 4.

Next, examples and comparative examples will be described.

Example 1

A voltage was applied to the liquid crystal device 4 which is used for the door 1 of the present invention, and is made into a visible state at a low voltage that is less than 30 volts.

As the liquid crystal device 4, a liquid crystal device which is 150 mm in width by 1750 mm in length by 7 mm in thickness was used. A polymer dispersed liquid crystal was obtained such that acrylic monomer was added to a liquid crystal composition consisting primarily of fluorophenyl-pyrimidine system, and was ultraviolet-irradiated. In addition, the structure of the liquid crystal device 4 was made such that the layer of the polymer dispersed liquid crystal is sandwiched between two glass substrates (which are respectively 3 mm in thickness), and the ITO electrodes are directly attached to the polymer dispersed liquid crystal so as to ground in the center of the both end portions in the longitudinal direction of the liquid crystal device 4.

The three size AA dry cells were used as the battery 8, to apply a voltage of 15 volts to the liquid crystal device 4 by boosting.

Then, the liquid crystal device 4 was made into a visible state in 0.1 seconds. Further, when stopping the application of a voltage, the liquid crystal device 4 was made into an invisible state in 0.1 seconds.

Comparative Example 1

A voltage was applied to a conventional liquid crystal device which is made into a visible state by applying a normal voltage thereto. Further, the size of the conventional liquid crystal device is 150 mm in width by 1750 mm in length by 7 mm in thickness, which is the same as that in Example 1. In addition, the conventional liquid crystal device was structured to be the same as the liquid crystal device described in Example 1 except for the point that a liquid crystal composition consisting primarily of a biphenyl compound was used.

In the same way as in the example, the three size AA dry cells were used, to apply a voltage of 15 volts to the conventional liquid crystal device by boosting. However, the conventional liquid crystal device did not vary.

Further, when a voltage of 60 volts was applied to the conventional liquid crystal device by further boosting, the conventional liquid crystal device was made into an invisible state. Further, when stopping the application of a voltage, the conventional liquid crystal device was made into an invisible state.

From the results of the example and the comparative example, it is understood that the opening and closing device of the present invention has an electrocution prevention effect as well.

That is, in general, it is a matter of life or death when a human body is exposed to a voltage of 42 volts or more. Accordingly, in the case where the conventional liquid crystal device which is made into a visible state at 60 volts, there is a risk of electrocution.

In contrast, in the opening and closing device of the present invention, because the liquid crystal device which is made into a visible state at 15 volts is used, there is no risk of electrocution.

That is, even when a person collides against the opening and closing device of the present invention, and bursts through the liquid crystal device by mistake, it does not result in electrocution at any time, and there is an extremely low risk of ignition due to the electrification.

Example 2

The liquid crystal device 4 described in Example 1 was attached to the main body 2 which is 800 mm in width by 2000 mm in length by 45 mm in thickness. In addition, the main body 2 has a structure which is the same as that of FIG. 1, and the respective parts such as the sensing unit were attached to the positions described in FIG. 1.

The battery 8 is three size AA dry cells in the same way as in Example 1, and was housed in the main body 2. The handheld portion 3A is a lever shape, and a touch sensor was attached to the inside of the lever. In addition, the handheld portions 3A are respectively provided to the two places on the front and back sides of the main body.

This main body 2 was attached to a wall to be used. Immediately after the indoor person 13 touched the lever, the liquid crystal device was varied transparent, thereby making the situation on the other side of the door visible. The liquid crystal device was returned to the original opaque state after 10 seconds based on the setting of the time setting unit 10. Because the hallway person 14 touched the lever before the indoor person 13 touched the lever, it was possible to check each other's existence before opening and closing the main body 2, thereby making it possible to prevent an unexpected accident.

Comparative Example 2

The liquid crystal device 4 is configured to be the same as in Example 2 except for the point that the liquid crystal device 4 described in Example 2 is made as the liquid crystal device described in Comparative Example 1.

This main body was attached to a wall to be used. Even when the indoor person 13 touched the lever, the liquid crystal device did not become transparent, thereby the situation on the other side of the door was invisible. Because the hallway person 14 came in the room in a situation where the indoor person 13 and the hallway person 14 faced each other across the main body, an accident where both collide with each other occurred when opening and closing the main body 2.

Comparative Example 3

In Comparative Example 2, it was intended to carry out a work so as to boost the power source (battery) to a general voltage of 100 volts. However, it was impossible to build the battery device into the main body, which resulted in the need to carry out electrical work independent of the main body. For this kind of work, a specialist who is qualified as an electrician was required, and an electricity distribution work for the wall 12 or the floor was required, therefore, large-scale work was required.

Example 3

A sliding door was used in place of the door (hinged door) in the configuration of Example 2, an RFID that a noncontact IC card is served as an RF tag was used in place of the touch sensor. In detail, antenna devices corresponding to the noncontact IC card are installed to the front and back surfaces of the sliding door. This RFID generates magnetism when the noncontact IC card is brought close to the antenna device, and a weak electric current flows therein.

This electric current serves as a switch, to supply power from the dry cell to the liquid crystal device. In this way, the liquid crystal device was varied transparent, thereby making the situation on the other side of the sliding door visible. The state in which the liquid crystal device is transparent continued as long as a weak electric current generated by magnetism flowed. In addition, the handheld portions of the sliding door are substantially vertically-long C-shaped handles (respectively one by one on the front and back sides).

This sliding door was attached to a wall to be used. When the indoor person brought the noncontact IC card close to the antenna device of the sliding door, the liquid crystal device was instantly (about 0.1 seconds) varied transparent, thereby making the situation on the other side of the door visible. In the same way, in the case where the person outside the room brought the noncontact IC card close to the antenna device of the sliding door as well, the liquid crystal device was instantly (about 0.1 seconds) varied transparent, thereby making the situation on the other side of the door visible.

Example 4

In the configuration of Example 3, an RFID was attached only to the front side of the sliding door. The handheld portions of the sliding door are substantially vertically-long C-shaped handles (respectively one by one on the front and back sides), and a touch sensor was attached to the handle located on the back side of the sliding door. This sliding door was capable of instantly (about 0.1 seconds) making the liquid crystal device transparent on one side by the RFID, and the other side by sensing of the touch sensor.

For example, the sliding door is installed such that the front side of the sliding door is on the passage side and the back side of the sliding door is on the indoor side in a hospital sickroom. When a nurse brings the noncontact IC card close to the antenna device of the sliding door, it is possible to observe the situation of a patient at the liquid crystal device sliding door. During night patrol, the sound of opening the sliding door may stress a patient in some cases. Meanwhile, with the sliding door obtained in Example 3, a nurse does not directly touch the sliding door at any time, thereby making it possible to silently watch for the situation of a patient without opening the sliding door.

Further, because it is possible to maintain the liquid crystal device in a transparent state while the noncontact IC card is brought close to the antenna device, it is possible to sufficiently verify the situation of the patient. During daylight or the like, when the patient puts his/her hand on the handle from indoors, the touch sensor senses it, and the liquid crystal device is varied transparent in the same way. It is possible for the patient to check the safety on the passage while staying in the sickroom at the time of coming out to the passage.

Example 5

In the configuration of Example 2, rechargeable batteries (nickel-metal hydride dry cells) were used in place of the dry cells. Further, the rechargeable batteries are commercial amorphous silicon solar batteries (about 200 mm by 450 mm, rated amperes of 4 watts), which are circuit-designed so as to be rechargeable. A door was obtained such that two amorphous silicon solar batteries were prepared, to be attached to the front and back surfaces of the door so as to align with the liquid crystal device.

When the door obtained in Example 5 was attached to a wall to be used, it was possible to use the door in the same way as in Example 2. In addition, the amorphous silicon solar batteries are capable of generating electricity from light of a fluorescent, and have high power generation efficiency even with low illuminance. Therefore, in an environment such that illumination is always turned on such as an office, it is possible to charge the rechargeable batteries as a result of being subjected to light for a long time.

The configurations of Examples 3 to 5 are shown in Table 1.

TABLE 1

|  | Example 3 | Example 4 | Example 5 |
| --- | --- | --- | --- |
| Battery | Dry cell | Dry cell | Solar battery + storage battery |
| Mode of handheld portion | Handle | Handle | Lever |
| Sensing unit (Sensor) | RFID | RFID Touch sensor | Touch sensor |
| Mode of opening and closing device | Sliding door | Sliding door | Door (Hinged door) |

As described above, the opening and closing device of the present invention includes a liquid crystal device which is capable of varying between an invisible state and a visible state reversibly, and which is made into a visible state or an invisible state at a low voltage in the case where the sensing unit senses an object, thereby it is possible to see the other side of the opening and closing device, and in contrast, it is impossible to be seen from the other side of the opening and closing device.

Accordingly, the opening and closing device of the present invention is capable of making visibility between an interior space and an exterior space better or worse.

Further, the liquid crystal device is able to be driven at a voltage of less than 30 volts, therefore, it is possible to drive the liquid crystal device for a long time by use of batteries.

Because the opening and closing device of the present invention is capable of driving the liquid crystal device at an extremely low voltage, it is possible to make the liquid crystal device visible or invisible by power which is extremely smaller than that for the conventional art.

Therefore, the present invention is preferably applicable for a house, an office, a factory, or the like.

What is claimed is:

1. An opening and closing device comprising:
    a sensing unit which senses an object; and
    a liquid crystal device which is capable of varying between an invisible state and a visible state reversibly, and which is driven at a low voltage, to be made into the visible state or the invisible state in the case where the sensing unit senses an object;
    a main body in which an aperture portion is formed; and
    a handheld portion which is attached to the main body, wherein
    the sensing unit senses the object which comes into contact with the handheld portion.

2. The opening and closing device according to claim 1, wherein the liquid crystal device is able to be driven at less than 30 volts.

3. The opening and closing device according to claim 2, wherein the liquid crystal device is able to be driven by batteries.

4. The opening and closing device according to claim 1, wherein
    the liquid crystal device is disposed in the aperture portion.

5. The opening and closing device according to claim 1 further comprising:
    a transparent member which is disposed in the aperture portion, and in which the liquid crystal device is attached to at least a part.

6. The opening and closing device according to claim 1, wherein the sensing unit senses an object located within a predetermined range from the liquid crystal device.

7. The opening and closing device according to claim 1, wherein the liquid crystal device is made into the invisible state or the visible state in the case where sensing by the sensing unit is released.

8. The opening and closing device according to claim 1 further comprising:
    a time setting unit which sets a time needed for the liquid crystal device to be made from the invisible state into the visible state, and a time needed for the liquid crystal device to be made from the visible state into the invisible state in the case where the sensing unit senses an object, or in the case where sensing by the sensing unit is released.

* * * * *